US012809010B2

(12) United States Patent
Seo et al.

(10) Patent No.: US 12,809,010 B2
(45) Date of Patent: Nov. 24, 2026

(54) METHOD AND APPARATUS DETERMINING LOCATION OF PEDESTRIAN

(71) Applicant: 42DOT INC., Seoul (KR)

(72) Inventors: Ji Won Seo, Seoul (KR); Myoung Hoon Cho, Seoul (KR); Yong Uk Lee, Seongnam (KR)

(73) Assignee: 42DOT INC., Seoul (KR)

( * ) Notice: Subject to any disclaimer, the term of this patent is extended or adjusted under 35 U.S.C. 154(b) by 495 days.

(21) Appl. No.: 18/165,355

(22) Filed: Feb. 7, 2023

(65) Prior Publication Data

US 2023/0251366 A1 Aug. 10, 2023

(30) Foreign Application Priority Data

Feb. 9, 2022 (KR) ........................ 10-2022-0017099

(51) Int. Cl.
*G01S 13/06* (2006.01)
*G01S 13/86* (2006.01)

(52) U.S. Cl.
CPC ............ *G01S 13/06* (2013.01); *G01S 13/867* (2013.01)

(58) Field of Classification Search
CPC ........ G01S 13/06; G01S 13/867; G06V 20/58
See application file for complete search history.

(56) References Cited

U.S. PATENT DOCUMENTS 9,633,483 B1 * 4/2017 Xu .......................... G06F 18/24
10,460,182 B1 * 10/2019 Park ...................... G01S 13/867
2005/0179582 A1 * 8/2005 Woodington ......... G01S 7/0232 342/128
2014/0176361 A1 * 6/2014 Dizaji ................. G01S 13/5244 342/93
2015/0170002 A1 * 6/2015 Szegedy .............. G06V 30/194 382/156
2016/0103213 A1 * 4/2016 Ikram ..................... G01S 13/42 342/105
2018/0107871 A1 * 4/2018 Singh ................... G06V 40/103
2018/0307921 A1 * 10/2018 Vallespi-Gonzalez ....................... G01S 17/66
2020/0380273 A1 * 12/2020 Saez ...................... G06V 10/85
2022/0234577 A1 * 7/2022 Baba ...................... G06V 20/58
(Continued)

FOREIGN PATENT DOCUMENTS

KR 20160035463 A 3/2016
KR 10-2098883 B1 4/2020
(Continued)

*Primary Examiner* — Vladimir Magloire
*Assistant Examiner* — Hailey R Le
(74) *Attorney, Agent, or Firm* — Harvest IP Law, LLP

(57) ABSTRACT

Provided are a method and apparatus for determining the location of a pedestrian, and the method includes obtaining, from a camera, a plurality of images of an outside of a vehicle and obtaining, from a radar, a plurality of radar measurement values of the outside of the vehicle, determining a pedestrian object included in the plurality of images, setting a plurality of object size candidate values for the pedestrian object, and determining longitudinal location candidate values for the plurality of object size candidate values, respectively, selecting radar measurement values located within a preset distance from the plurality of longitudinal location candidate values, and determining a final longitudinal location value of the pedestrian object, based on the selected radar measurement values.

11 Claims, 13 Drawing Sheets

(56) References Cited

U.S. PATENT DOCUMENTS

| | | | | |
|---|---|---|---|---|
| 2022/0366700 | A1* | 11/2022 | Endo | G06T 7/74 |
| 2022/0383643 | A1* | 12/2022 | Takano | G06T 7/593 |

FOREIGN PATENT DOCUMENTS

| | | | |
|---|---|---|---|
| KR | 20200071959 | A | 6/2020 |
| KR | 20200072714 | A | 6/2020 |
| KR | 10-2250262 | B1 | 5/2021 |
| KR | 10-2310433 | B1 | 10/2021 |
| KR | 10-2328644 | B1 | 11/2021 |

* cited by examiner

METHOD AND APPARATUS DETERMINING LOCATION OF PEDESTRIAN

CROSS-REFERENCE TO RELATED APPLICATION

This application is based on and claims priority under 35 U.S.C. § 119 to Korean Patent Application No. 10-2022-0017099, filed on Feb. 9, 2022, in the Korean Intellectual Property Office, the disclosure of which is incorporated by reference herein in its entirety.

BACKGROUND

1. Field

The present disclosure relates to a method and apparatus for determining the location of a pedestrian.

2. Description of the Related Art

Along with the merging of information communication technology and the vehicle industry, smartization of vehicles is rapidly progressing. The smartization of vehicles enables the vehicles to evolve from simple mechanical devices to smart cars, and in particular, autonomous driving is attracting attention as a core technology of smart cars. Autonomous driving is a technology that allows a vehicle to reach its destination on its own without a driver manipulating the steering wheel, accelerator pedal, or brake.

There is a need for research on a method of recognizing a pedestrian and calculating the distance between a vehicle and the pedestrian during autonomous driving.

When recognizing a pedestrian and estimating the distance by using a camera, a lot of distance information is lost because objects in the real world are projected onto a two-dimensional image. In particular, a large deviation of features that are frequently used in calculating the location of a pedestrian (the height of the pedestrian or the point at which the pedestrian is in contact with the ground) causes a wide margin of error.

When recognizing a pedestrian and estimating the distance by using a radar, the radar has a poor ability to classify an object, and thus is difficult to determine whether an object is a pedestrian.

The related art described above is technical information that the inventor(s) of the present disclosure has achieved to derive the present disclosure or has achieved during the derivation of the present disclosure, and thus, it cannot be considered that the related art has been published to the public before the filing of the present disclosure.

SUMMARY

Provided are methods and apparatuses for determining the location of a pedestrian. Technical objects of the present disclosure are not limited to the foregoing, and other unmentioned objects or advantages of the present disclosure would be understood from the following description and be more clearly understood from the embodiments of the present disclosure. In addition, it would be appreciated that the objects and advantages of the present disclosure may be implemented by means provided in the claims and a combination thereof.

Additional aspects will be set forth in part in the description which follows and, in part, will be apparent from the description, or may be learned by practice of the presented embodiments of the disclosure.

According to a first aspect of the present disclosure, a method of determining a location of a pedestrian includes obtaining, from a camera, a plurality of images of an outside of a vehicle and obtaining, from a radar, a plurality of radar measurement values of the outside of the vehicle, determining a pedestrian object included in the plurality of images, setting a plurality of object size candidate values for the pedestrian object, and determining longitudinal location candidate values for the plurality of object size candidate values, respectively, selecting radar measurement values located within a preset distance from the plurality of longitudinal location candidate values, and determining a final longitudinal location value of the pedestrian object, based on the selected radar measurement values.

According to a second aspect of the present disclosure, an apparatus for determining a location of a pedestrian includes a memory storing at least one program, and a processor configured to executing the at least one program to perform an operation, and the processor is further configured to obtain, from a camera, a plurality of images of an outside of a vehicle, obtain, from a radar, a plurality of radar measurement values of the outside of the vehicle, determine a pedestrian object included in the plurality of images, set a plurality of object size candidate values for the pedestrian object, determine longitudinal location candidate values for the plurality of object size candidate values, respectively, select radar measurement values located within a preset distance from the plurality of longitudinal location candidate values, and determine a final longitudinal location value of the pedestrian object, based on the selected radar measurement values.

According to a third aspect of the present disclosure, a computer-readable recording medium may have recorded thereon a program for executing, on a computer, the method according to the first aspect.

In addition, other methods and systems for implementing the present disclosure, and a computer-readable recording medium having recorded thereon a computer program for executing the methods may be further provided.

Other aspects, features, and advantages other than those described above will be apparent from the following drawings, claims, and detailed description.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
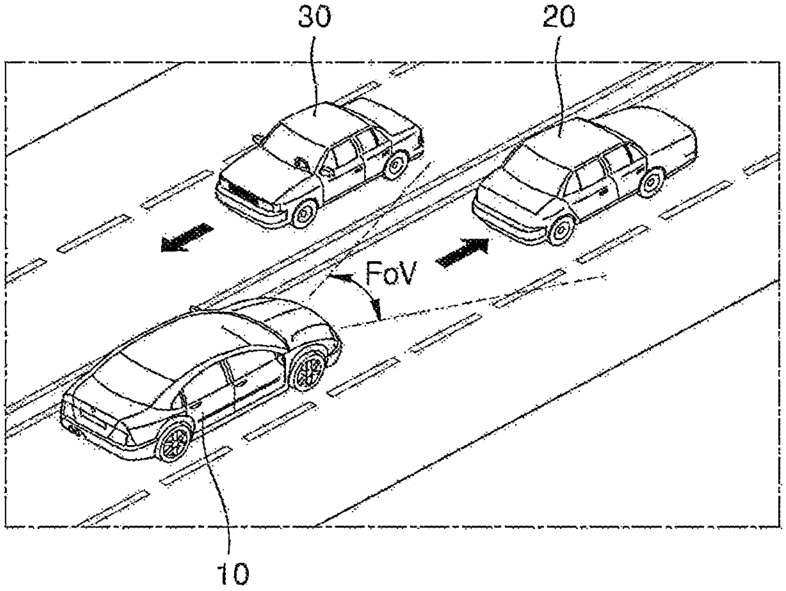
FIGS. 1 to 3 are diagrams for describing an autonomous driving method according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Advantages and features of the present disclosure and a method for achieving them will be apparent with reference to embodiments of the present disclosure described below together with the attached drawings. The present disclosure may, however, be embodied in many different forms and should not be construed as being limited to the embodiments set forth herein, and all changes, equivalents, and substitutes that do not depart from the spirit and technical scope of the present disclosure are encompassed in the present disclosure. These embodiments are provided such that the present disclosure will be thorough and complete, and will fully convey the concept of the present disclosure to those of skill in the art. In describing the present disclosure, detailed explanations of the related art are omitted when it is deemed that they may unnecessarily obscure the gist of the present disclosure.

Terms used herein are for describing particular embodiments and are not intended to limit the scope of the present disclosure. A singular expression may include a plural expression unless they are definitely different in a context. As used herein, terms such as "comprises," "includes," or "has" specify the presence of stated features, numbers, stages, operations, components, parts, or a combination thereof, but do not preclude the presence or addition of one or more other features, numbers, stages, operations, components, parts, or a combination thereof.

Some embodiments of the present disclosure may be represented by functional block components and various processing operations. Some or all of the functional blocks may be implemented by any number of hardware and/or software elements that perform particular functions. For example, the functional blocks of the present disclosure may be embodied by at least one microprocessor or by circuit components for a certain function. In addition, for example, the functional blocks of the present disclosure may be implemented by using various programming or scripting languages. The functional blocks may be implemented by using various algorithms executable by one or more processors. Furthermore, the present disclosure may employ known technologies for electronic settings, signal processing, and/or data processing. Terms such as "mechanism", "element", "unit", or "component" are used in a broad sense and are not limited to mechanical or physical components.

In addition, connection lines or connection members between components illustrated in the drawings are merely exemplary of functional connections and/or physical or circuit connections. Various alternative or additional functional connections, physical connections or circuit connections may be present in a practical device.

Hereinafter, the term 'vehicle' may refer to all types of transportation instruments with engines that are used to move passengers or goods, such as cars, buses, motorcycles, kick scooters, or trucks.

Hereinafter, the present disclosure will be described in detail with reference to the accompanying drawings.

Figure 2:
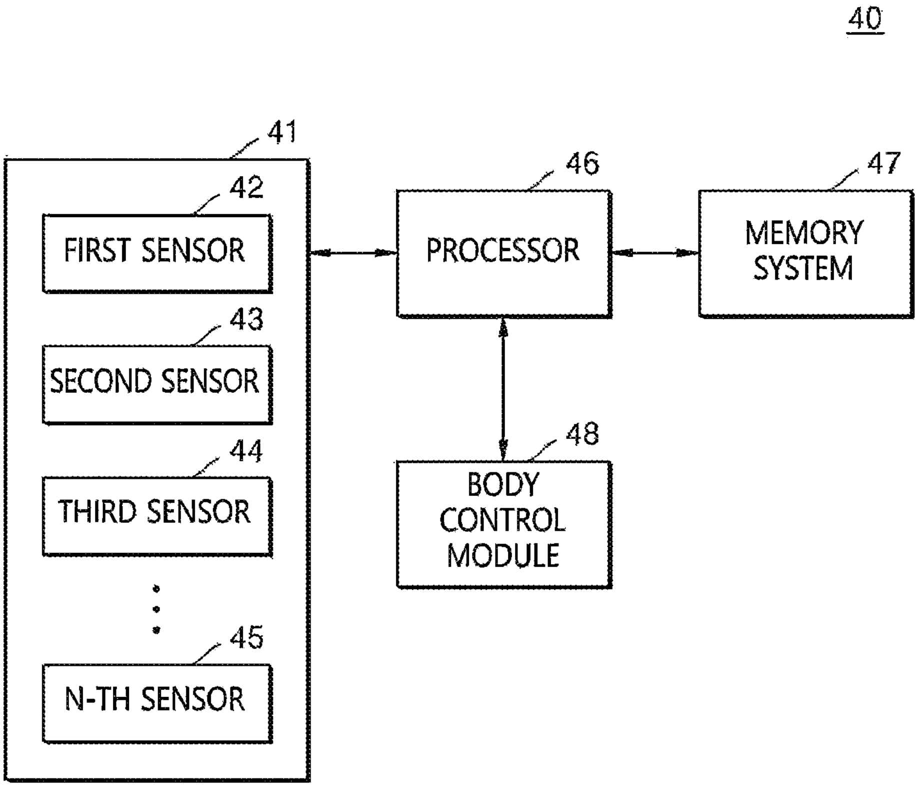
Figure 3:
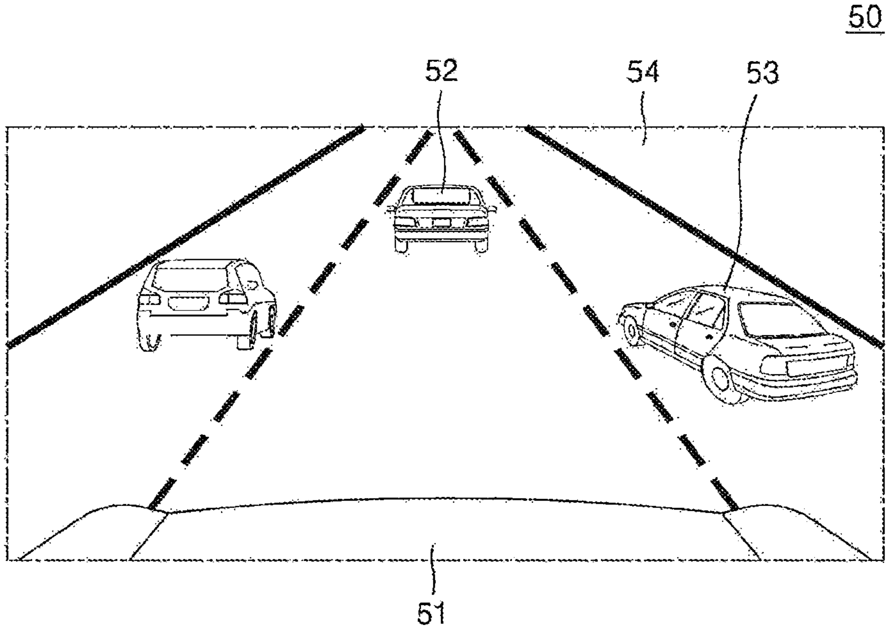

FIGS. 1 to 3 are diagrams for describing an autonomous driving method according to an embodiment.

Referring to FIG. 1, an autonomous driving apparatus according to an embodiment of the present disclosure may be mounted on a vehicle to implement an autonomous vehicle 10. The autonomous driving apparatus mounted on the autonomous vehicle 10 may include various sensors configured to collect situational information around the autonomous vehicle 10. For example, the autonomous driving apparatus may detect a movement of a preceding vehicle 20 traveling in front of the autonomous vehicle 10, through an image sensor and/or an event sensor mounted on the front side of the autonomous vehicle 10. The autonomous driving apparatus may further include sensors configured to detect, in addition to the preceding vehicle 20 traveling in front of the autonomous vehicle 10, another traveling vehicle 30 traveling in an adjacent lane, and pedestrians around the autonomous vehicle 10.

At least one of the sensors configured to collect the situational information around the autonomous vehicle may have a certain field of view (FoV) as illustrated in FIG. 1. For example, in a case in which a sensor mounted on the front side of the autonomous vehicle 10 has a FoV as illustrated in FIG. 1, information detected from the center of the sensor may have a relatively high importance. This may be because most of information corresponding to the movement of the preceding vehicle 20 is included in the information detected from the center of the sensor.

The autonomous driving apparatus may control the movement of the autonomous vehicle 10 by processing information collected by the sensors of the autonomous vehicle in real time, while storing, in a memory device, at least part of the information collected by the sensors.

Referring to FIG. 2, an autonomous driving apparatus 40 may include a sensor unit 41, a processor 46, a memory system 47, a body control module 48, and the like. The sensor unit 41 may include a plurality of sensors 42 to 45, and the plurality of sensors 42 to 45 may include an image sensor, an event sensor, an illuminance sensor, a global positioning system (GPS) device, an acceleration sensor, and the like.

Data collected by the sensors 42 to 45 may be delivered to the processor 46. The processor 46 may store, in the memory system 47, the data collected by the sensors 42 to 45, and control the body control module 48 based on the data collected by the sensors 42 to 45 to determine the movement of the vehicle. The memory system 47 may include two or more memory devices and a system controller configured to control the memory devices. Each of the memory devices may be provided as a single semiconductor chip.

Other than the system controller of the memory system 47, each of the memory devices included in the memory system 47 may include a memory controller, which may include an artificial intelligence (AI) computation circuit such as a neural network. The memory controller may generate computational data by applying certain weights to data received from the sensors 42 to 45 or the processor 46, and store the computational data in a memory chip.

FIG. 3 is a diagram illustrating an example of image data obtained by a sensor of an autonomous vehicle on which an autonomous driving apparatus is mounted. Referring to FIG. 3, image data 50 may be data obtained by a sensor mounted on the front side of the autonomous vehicle. Thus, the image data 50 may include a front area 51 of the autonomous vehicle, a preceding vehicle 52 traveling in the same lane as the autonomous vehicle, a traveling vehicle 53 around the autonomous vehicle, and a region of non-interest 54.

In the image data 50 according to the embodiment illustrated in FIG. 3, data regarding a region including the front area 51 of the autonomous vehicle and the region of non-interest 54 may be unlikely to affect the driving of the autonomous vehicle. In other words, the front area 51 of the autonomous vehicle and the region of non-interest 54 may be regarded as data having a relatively low importance.

On the other hand, the distance to the preceding vehicle 52 and a movement of the traveling vehicle 53 to change lanes or the like may be significantly important factors in terms of safe driving of the autonomous vehicle. Accordingly, data regarding a region including the preceding vehicle 52 and the traveling vehicle 53 in the image data 50 may have a relatively high importance in terms of the driving of the autonomous vehicle.

A memory device of the autonomous driving apparatus may apply different weights to different regions of the image data 50 received from a sensor, and then store the image data 50. For example, a high weight may be applied to the data regarding the region including the preceding vehicle 52 and the traveling vehicle 53, and a low weight may be applied to the data regarding the region including the front area 51 of the autonomous vehicle and the region of non-interest 54.

Figure 4A:
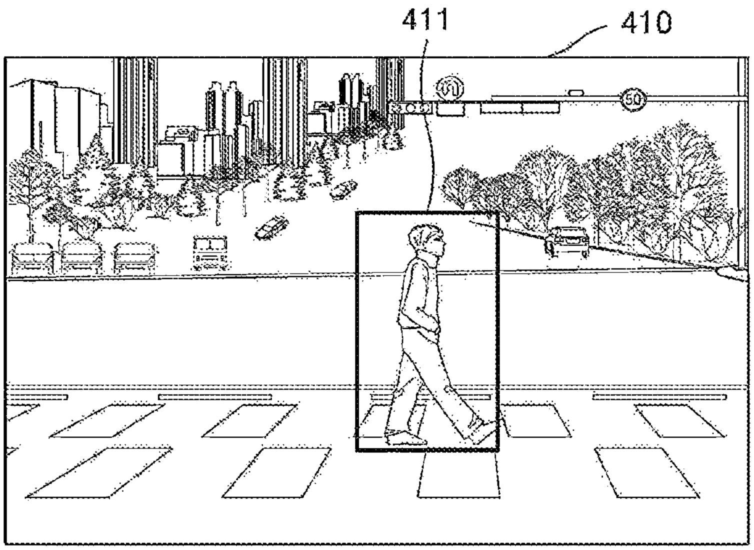
FIGS. 4A and 4B are diagrams related to a camera configured to photograph the outside of a vehicle, according to an embodiment.
Figure 4B:
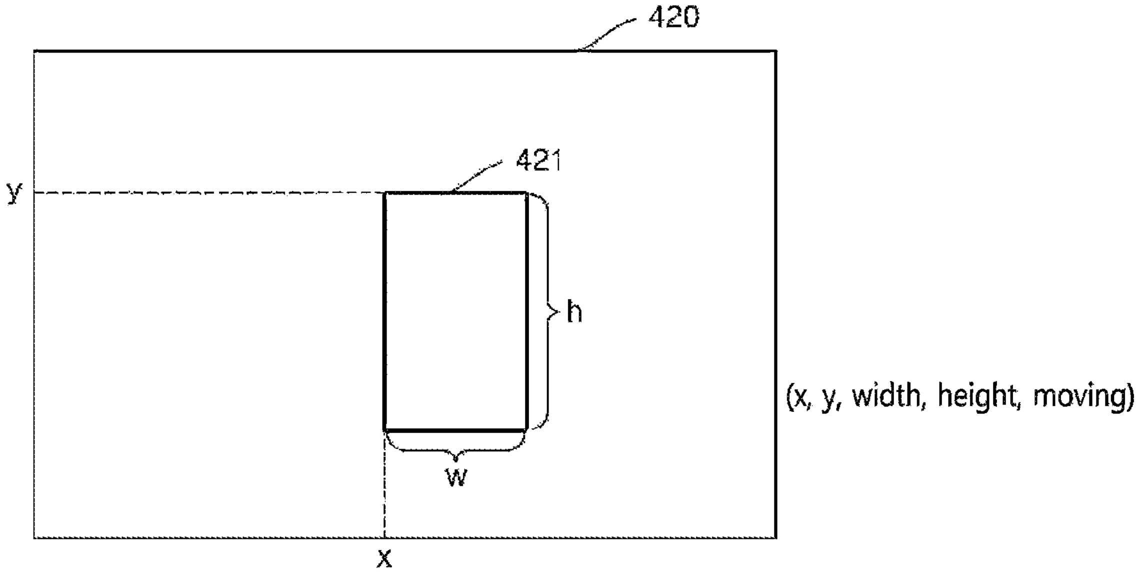

FIGS. 4A and 4B are diagrams related to a camera configured to photograph the outside of a vehicle, according to an embodiment.

The camera may be mounted on the vehicle to photograph the outside of the vehicle. The camera may photograph front, side, and rear areas around the vehicle. An apparatus for determining the location of a pedestrian may obtain a plurality of images captured by the camera. The plurality of images captured by the camera may include a plurality of objects.

Information about an object includes object type information and object attribute information. Here, the object type information is index information indicating the type of object, and is composed of a group indicating a supercategory, and a class indicating a subcategory. In addition, the object attribute information indicates attribute information about the current state of the object, and includes action information, rotate information, traffic information, color information, and visibility information.

In an embodiment, groups and classes included in object type information may be as shown in Table 1 below, but are not limited thereto.

TABLE 1

| Group | Class |
|---|---|
| Flat | Road, Sidewalk, Parking, Ground, Crosswalk |
| Human | Pedestrian, Rider |
| Vehicle | Car, Truck, Bus, Bike, Mobility |
| Construction | Building, Wall, Guard rail, Tunnel, Fence, Soundproof wall, Gas station, IC, Pylon |

TABLE 1-continued

| Group | Class |
|---|---|
| Object | Pole, Traffic sign, Traffic light, Color cone |
| Nature | Vegetation, Terrain, Paddy field, Field, River, Lake |
| Void | Static |
| Lane | Dotted line, Solid line, Dotted and Solid line, Double Solid line |
| Sky | Sky |
| Animal | Dog, Cat, Bird, etc |

In addition, information included in the object attribute information may include action information, rotation information, traffic information, color information, and visibility information.

Action information is about a movement of an object, and may be defined as 'Stopped', 'Parking', 'Moving', or the like. Object attribute information of a vehicle may be determined as 'Stopped', 'Parking', or 'Moving', object attribute information of a pedestrian may be determined as 'Moving', 'Stopped', or 'Unknown', and object attribute information of an immovable object, such as a traffic light, may be determined as 'Stopped', which is a default.

Rotate information is information about the rotation of an object, and may be defined as 'Forward', 'Backward', 'Horizontal', 'Vertical', 'Lateral', or the like. Object attribute information of a vehicle may be determined as 'Front', 'Rear', or 'Side', and object attribute information of a horizontal or vertical traffic light may be determined as 'Horizontal' or 'Vertical'.

Traffic information is traffic-related information of an object, and may be defined as 'Instruction', 'Caution', 'Regulation', 'Auxiliary sign', or the like of a traffic sign. Color information is information about the color of an object, and may represent the color of an object, a traffic light, or a traffic sign.

Referring to FIG. 4A, an object 411 may be a pedestrian. An image 410 may have a certain size. A plurality of images 410 may include the same object 411, but as the vehicle travels along the road, the relative locations of the vehicle and the object 411 continuously change, and as the object 411 also moves over time, the location of the same object 411 in the images changes.

Using all images to determine which object is the same in the images causes significant increases in the amount of data transmission and the amount of computation. Accordingly, it is difficult to perform processing through edge computing in an apparatus mounted on a vehicle, and it is also difficult to perform real-time analysis.

Referring to FIG. 4B, a bounding box 421 included in an image 420 is illustrated. The bounding box 421 is metadata about the object 411, and bounding box information may include object type information (e.g., group, class, etc.), information about location on the image 420, size information, and the like.

Referring to FIG. 4B, the bounding box information may include information that the object 411 corresponds to a pedestrian class, information that the upper left vertex of the object 411 is located at (x, y) on the image, information that the size of the object 411 is w*h, and current state information that the object 411 is moving (i.e., action information).

Figure 5:
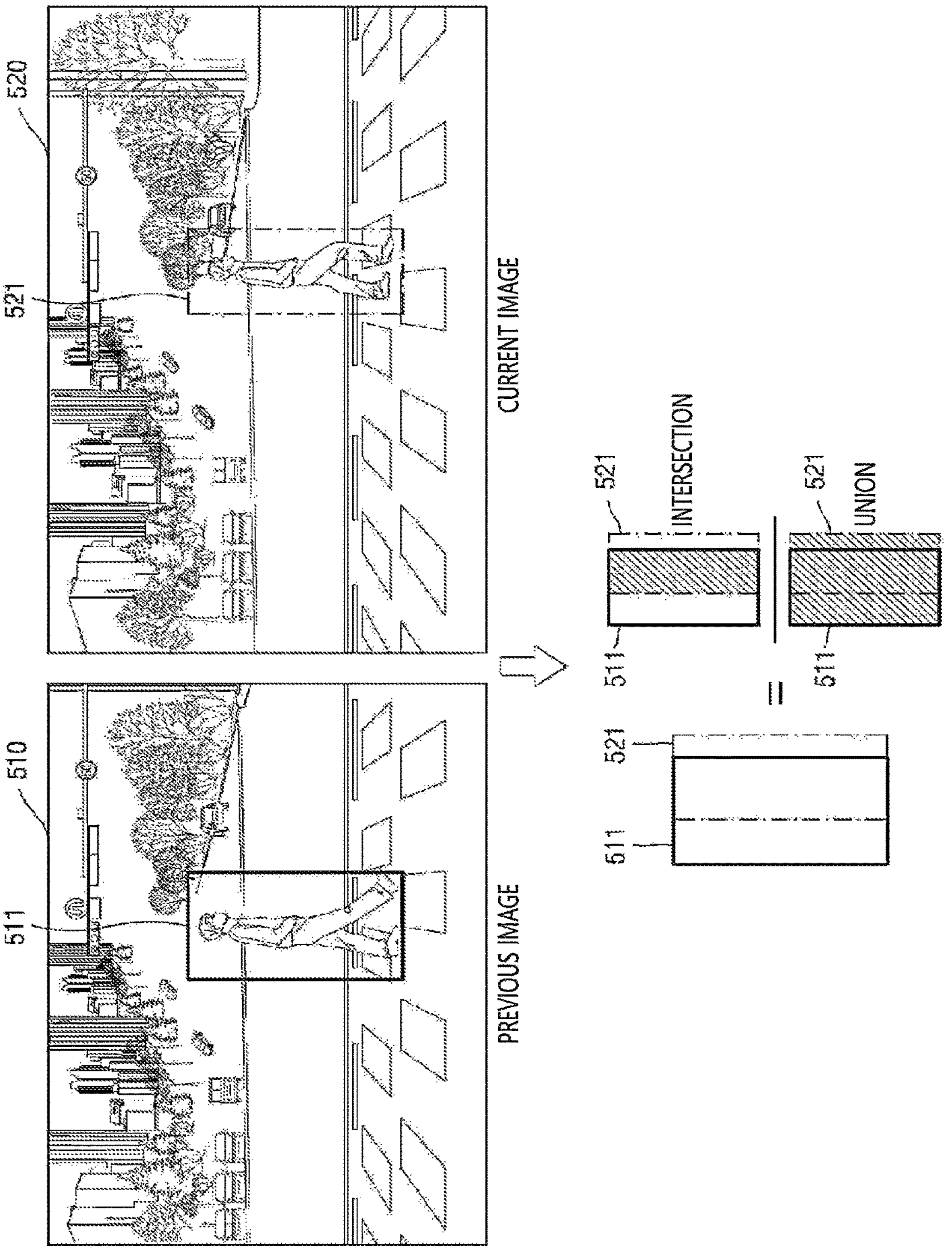
FIG. 5 is a flowchart illustrating a method of recognizing an object according to an embodiment.

FIG. 5 is a flowchart illustrating a method of recognizing an object according to an embodiment.

An apparatus for determining the location of a pedestrian may obtain a plurality of images from a camera. The plurality of images may include a previous image 510 and a current image 520.

The apparatus for determining the location of a pedestrian may recognize a first pedestrian object 511 in the previous image 510.

In an embodiment, the apparatus for determining the location of a pedestrian may divide an image into grids having the same size, predict the number of bounding boxes designated in a predefined shape around the center of each grid, and calculate reliability based on the bounding boxes. The apparatus for determining the location of a pedestrian may determine whether an object is included in the image or only a background is included, select a location having high object reliability, and determine an object category, thereby recognizing the object. However, the method of recognizing an object in the present disclosure is not limited thereto.

The apparatus for determining the location of a pedestrian may obtain first location information of the first pedestrian object 511 recognized in the previous image 510. As described above with reference to FIGS. 4A and 4B, the first location information may include coordinate information of any one vertex (e.g., the upper left vertex) of a bounding box corresponding to the first pedestrian object 511 on the previous image 510, and horizontal and vertical length information.

In addition, the apparatus for determining the location of a pedestrian may obtain second location information of a second pedestrian object 521 recognized in the current image 520.

The apparatus for determining the location of a pedestrian may calculate a similarity between the first location information of the first pedestrian object 511 recognized in the previous image 510, and the second location information of the second pedestrian object 521 recognized in the current image 520.

Referring to FIG. 5, the apparatus for determining the location of a pedestrian may calculate an intersection and a union between the first pedestrian object 511 and the second pedestrian object 521 by using the first location information and the second location information. The apparatus for determining the location of a pedestrian may calculate a value of an intersection area with respect to a union area, and based on the calculated value being greater than or equal to a threshold value, determine that the first pedestrian object 511 and the second pedestrian object 521 are the same pedestrian object.

However, the method of determining identity between pedestrian objects is not limited to the above method.

Figure 6:
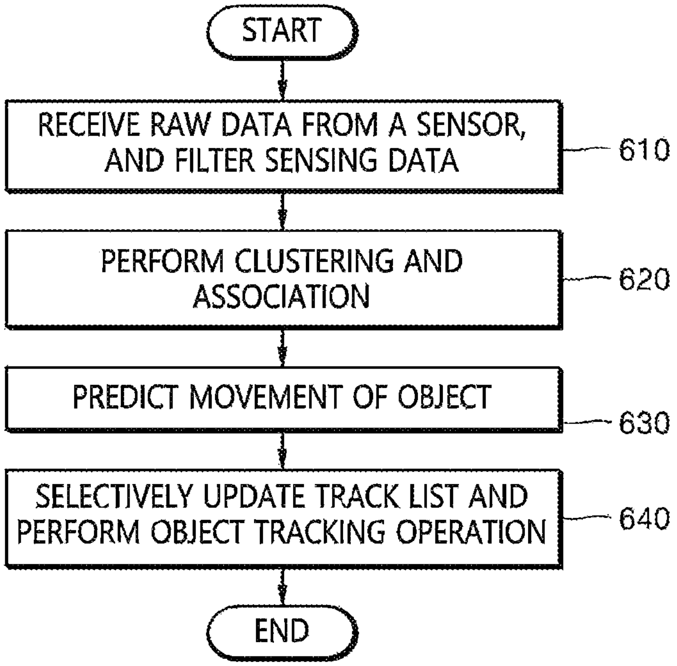
FIG. 6 is a flowchart illustrating a method of tracking an object according to an embodiment.

FIG. 6 is a flowchart illustrating a method of tracking an object according to an embodiment.

Object tracking refers to recognizing the same object over successive time intervals. Object tracking is an operation of receiving information from sensors, such as a lidar or a camera, to obtain the location, speed, and type of an object (e.g., a target vehicle, a pedestrian, an obstacle). Data processing of object tracking may be divided into sensing data filtering and tracking. Tracking includes clustering, data association, object motion prediction, optional track list update, and object tracking operations. Here, the object tracking operation includes merge, classification of an object to be tracked, and initiation of object tracking.

In operation 610, the apparatus for determining the location of a pedestrian may receive raw data from a sensor, and filter sensing data.

The filtering is a process of processing the raw data from the sensor, before performing tracking. The apparatus for determining the location of a pedestrian may set a region of interest to reduce the number of sensing points, and classify only object points required for the tracking by removing ground noise.

In operation 620, the apparatus for determining the location of a pedestrian may perform clustering on the filtered sensing data, and perform an association operation.

Through the clustering, the apparatus for determining the location of a pedestrian may generate a single point by clustering several points generated in one object. In addition, in order for the apparatus for determining the location of a pedestrian to track an object, an operation of associating the point generated through the clustering with data of previously tracked points is required. For example, the apparatus for determining the location of a pedestrian may associate the two pieces of data with each other by traversing previously tracked objects to select, from among the clustered points of the object, the clustered point of the object that is currently closest to points of the previously tracked objects, through the sensor. In order to increase the accuracy of an object tracking algorithm in the data association operation, even in a case in which the closest point of the clustered object is selected, the apparatus for determining the location of a pedestrian may remove the selected point when the movement of the clustered object is uncertain or unpredictable. To this end, a probability-based algorithm may be used.

In operation 630, the apparatus for determining the location of a pedestrian may predict a movement of the object. In more detail, the apparatus for determining the location of a pedestrian may predict locations of objects to be tracked, through measured values related to the movement of the object, through operations 610 and 620. To this end, a probability-based algorithm may be used. In a case in which there is no measured value related to the movement of the object, the predicted movement of the object may be a measured value related to the movement of the object. On the contrary, in a case in which there is a measured value related to the movement of the object, the value related to the movement of the object may be updated through the predicting of the movement of the object.

In operation 640, the apparatus for determining the location of a pedestrian may selectively update a track list and perform an object tracking operation.

As described above, in a case in which there is a measured value related to the movement of the object, the apparatus for determining the location of a pedestrian may update a track list that is managed for each object. To this end, a Kalman filter may be used. In addition, in order to perform the object tracking operation, the apparatus for determining the location of a pedestrian may perform a process of merging, into one object, objects that are moving at similar speeds at certain distances from the tracked object, and a process of classifying the tracked object in which the tracking is stopped, in a case in which the number of points of sensing data that match the tracked object is less than or equal to a threshold, and then initiate object tracking. However, even in this case, the object tracking may be initiated after verifying a point of the sensing data on which the data association has not been performed, in order to determine whether the point of the sensing data is a ghost.

In the present disclosure, the object tracking method is not limited to the above operations, and an object tracking algorithm for a similar purpose may also be included.

The apparatus for determining the location of a pedestrian may recognize an object included in a plurality of images and track the trajectory of the object, based on the method described above with reference to FIG. 6.

Figure 7:
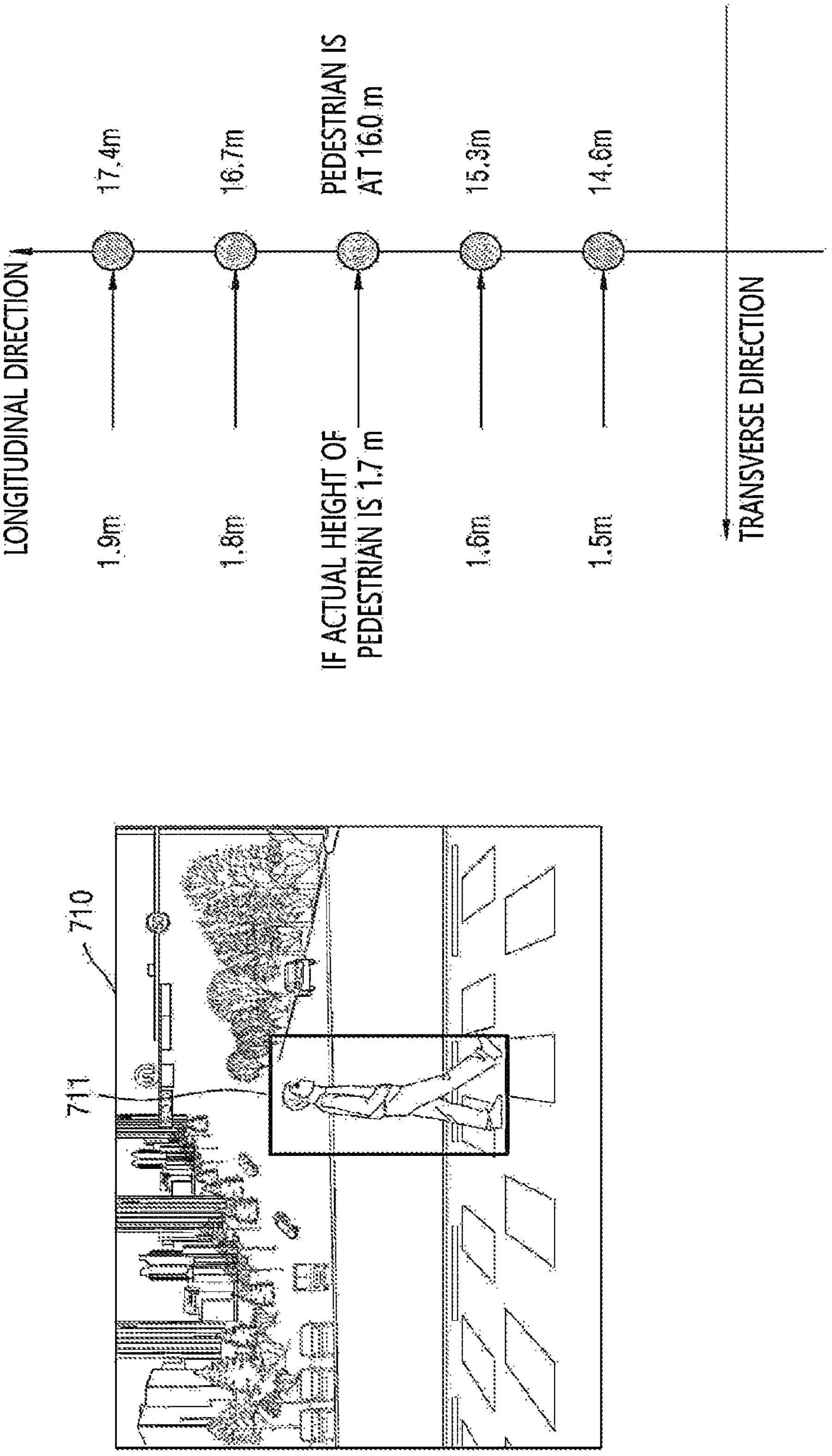
FIG. 7 is an exemplary diagram for describing a method of determining longitudinal location candidate values of an object, according to an embodiment.

FIG. 7 is an exemplary diagram for describing a method of determining longitudinal location candidate values of an object, according to an embodiment.

An apparatus for determining the location of a pedestrian may determine a pedestrian object 711 included in an image 710. The apparatus for determining the location of a pedestrian may obtain location information of the pedestrian object 711. The location information may include coordinate information of any one vertex of a bounding box corresponding to the pedestrian object 711, and horizontal and vertical length information.

The apparatus for determining the location of a pedestrian may set a plurality of object size candidate values for the pedestrian object 711. In an embodiment, the plurality of object size candidate values may be values into which a possible height range of a pedestrian is divided by a preset interval. Referring to FIG. 7, the plurality of object size candidate values may be 1.5 m, 1.6 m, 1.7 m, 1.8 m, and 1.9 m.

The apparatus for determining the location of a pedestrian may determine longitudinal location candidate values by using the object size candidate values, pixel values of the object, and the focal length of the camera. In detail, the apparatus for determining the location of a pedestrian may determine the longitudinal location candidate values by using Equation 1 below. In Equation 1, the pixel height of the object denotes the pixel height of the bounding box corresponding to the pedestrian object 711.

[Equation 1]

$$\text{Longitudinal location candidate value} = \text{Object size candidate value} \times \frac{\text{Focal length of camera}}{\text{Pixel height of object}}$$

Referring to FIG. 7, when the focal length of the camera and the pixel height of the object are preset values, longitudinal location candidate values corresponding to the object size candidate values 1.5 m, 1.6 m, 1.7 m, 1.8 m, and 1.9 m are 14.6 m, 15.3 m, 16.0 m, 16.7 m and 17.4 m, respectively. That is, for the same location and size of a bounding box corresponding to a pedestrian object in an image, the greater the actual height of the pedestrian object, the farther the pedestrian is positioned from the camera-equipped vehicle. Meanwhile, the numerical values for the focal length of the camera and the pixel height of the object are only examples, and may vary depending on the type of the camera.

Meanwhile, the apparatus for determining the location of a pedestrian may correct the determined longitudinal location candidate values, considering the position of the camera. Here, the position may be a value including various factors that may affect a captured image, such as camera direction, angle, or shot.

For example, the position of the camera may change over a period of time. Alternatively, the position of the camera may change in response to a particular event occurring. Alternatively, the position of the camera may change in response to an external input.

The apparatus for determining the location of a pedestrian may correct the longitudinal location candidate values considering whether the angle of the camera is toward the sky or the ground, or whether the direction of the camera is toward the front or the side.

Figure 8:
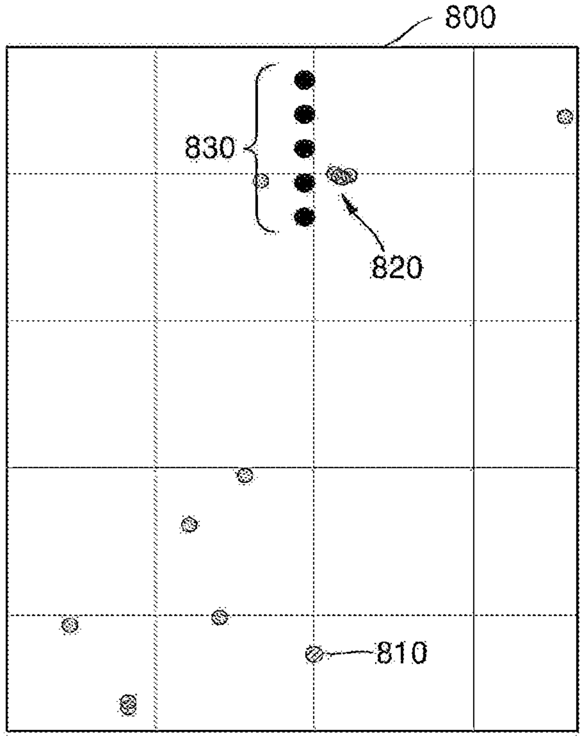
FIG. 8 is an exemplary diagram for describing a method of selecting radar measurement values considering longitudinal location candidate values, according to an embodiment.

FIG. 8 is an exemplary diagram for describing a method of selecting radar measurement values considering longitudinal location candidate values, according to an embodiment.

FIG. 8 illustrates a bird's-eye view coordinate plane 800 corresponding to a current image obtained from a camera. In the bird's-eye view coordinate plane 800, a first location 810 represents the location of the camera. Alternatively, the first location 810 represents the location of a vehicle on which the camera is mounted.

In the bird's-eye view coordinate plane 800, a third location set 830 represents each of a plurality of longitudinal location candidate values for a pedestrian object. Referring to FIG. 7, in a case in which object size candidate values for the pedestrian object are set to 1.5 m, 1.6 m, 1.7 m, 1.8 m, and 1.9 m, longitudinal location candidate values corresponding to the object size candidate values are 14.6 m, 15.3 m, 16.0 m, 16.7 m, and 17.4 m, respectively. That is, the apparatus for determining the location of a pedestrian may determine that the value of the third location set 830 closest to the first location 810 in the bird's-eye view coordinate plane 800 corresponds to the object size candidate value of 1.5 m, and determine that the value of the third location set 830 farthest from the first location 810 corresponds to the object size candidate value of 1.9 m. In addition, the apparatus for determining the location of a pedestrian may determine that the remaining three values of the third location set 830 correspond to the object size candidate values of 1.6 m, 1.7 m, and 1.8 m, respectively.

Meanwhile, a radar may be mounted on a vehicle to sense an object outside the vehicle. The radar may sense front, side, and rear areas around the vehicle. The apparatus for determining the location of a pedestrian may obtain, from the radar, a plurality of radar measurement values for the outside of the vehicle.

The plurality of radar measurement values may be indicated on the bird's-eye view coordinate plane 800.

The apparatus for determining the location of a pedestrian may select radar measurement values located within a preset distance from the longitudinal location candidate values, from among the plurality of radar measurement values. Referring to FIG. 8, from among the plurality of radar measurement values indicated on the bird's-eye view coordinate plane 800, the apparatus for determining the location of a pedestrian may select a radar measurement value indicated at a second location 820 around the third location set 830.

The apparatus for determining the location of a pedestrian may determine a final longitudinal location value of the pedestrian object, based on the radar measurement value indicated at the second location 820.

In an embodiment, the apparatus for determining the location of a pedestrian may determine the second location 820 as the final longitudinal location value of the pedestrian object.

In another embodiment, the apparatus for determining the location of a pedestrian may apply the radar measurement value indicated at the second location 820 to a Kalman filter, and determine, as the final longitudinal location value, a value derived from the Kalman filter.

In the present disclosure, the distance between a vehicle and a pedestrian object may be more accurately measured by recognizing the pedestrian object by using an image obtained from a camera and determining a matched radar measurement value based on longitudinal location candidate values of the pedestrian object.

Figure 9:
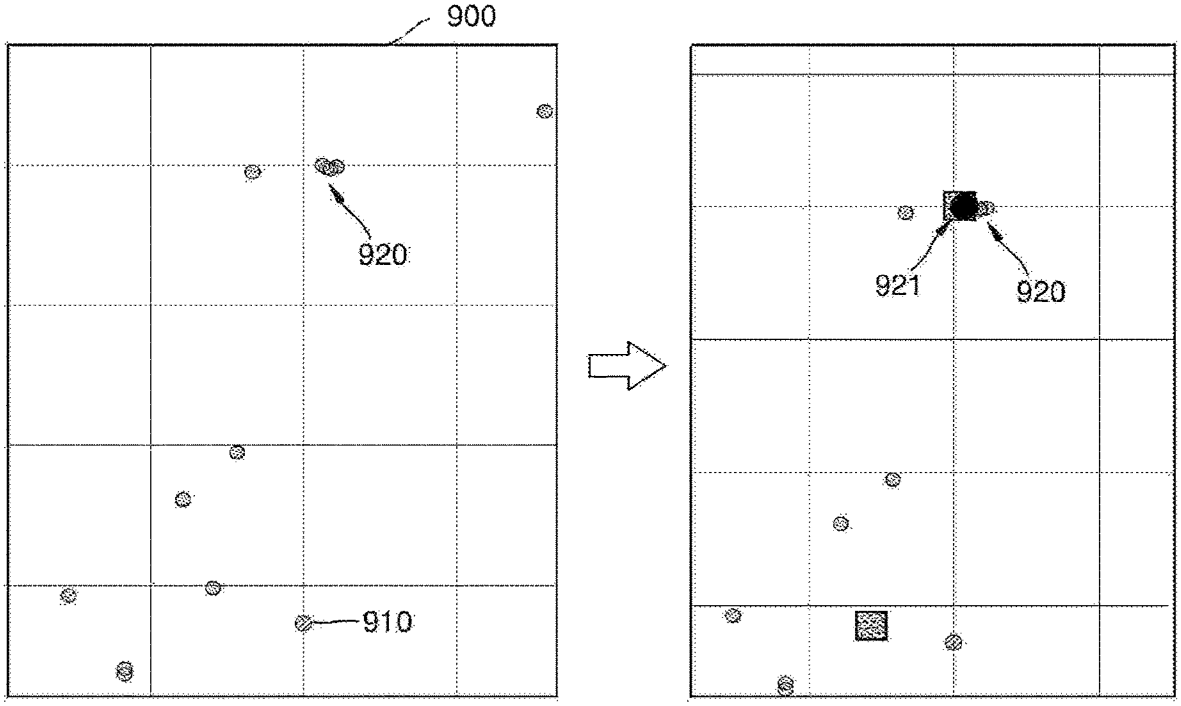
FIG. 9 is an exemplary diagram for describing a method of removing outliers according to an embodiment.

FIG. 9 is an exemplary diagram for describing a method of removing outliers according to an embodiment.

FIG. 9 illustrates a bird's-eye view coordinate plane 900 corresponding to a current image obtained from a camera. In the bird's-eye view coordinate plane 900, a first location 910 represents the location of the camera. Alternatively, the first location 910 represents the location of a vehicle on which the camera is mounted.

A radar measurement value indicated at a second location 920 in the bird's-eye view coordinate plane 900 corresponds to the radar measurement value indicated at the second location 820 of FIG. 8. The apparatus for determining the location of a pedestrian may determine a final longitudinal location value of a pedestrian object, based on the radar measurement value indicated at the second location 920.

Meanwhile, in a case in which a certain condition is satisfied, the apparatus for determining the location of a pedestrian may remove outliers for the radar measurement value.

As the outliers are removed according to various embodiments to be described below, the apparatus for determining the location of a pedestrian may correct the radar measurement value indicated at the second location 920 to a third location 921.

In an embodiment, the apparatus for determining the location of a pedestrian may remove outliers of a radar measurement value for the current image, considering a final longitudinal location value of the pedestrian object determined based on a previous image.

According to the method described above with reference to FIG. 5, the apparatus for determining the location of a pedestrian may determine that a first pedestrian object included in the previous image and a second pedestrian object included in the current image are the same object. In addition, the apparatus for determining the location of a pedestrian may use a final longitudinal location value of the first pedestrian object included in the previous image, in order to remove the outliers of the radar measurement value of the current image.

In detail, the apparatus for determining the location of a pedestrian may obtain a first final longitudinal location value of the pedestrian object for the previous image. In addition, the apparatus for determining the location of a pedestrian may obtain a selected radar measurement value for the current image.

In a case in which the first final longitudinal location value and the selected radar measurement value are within a preset distance, the apparatus for determining the location of a pedestrian may determine a second final longitudinal location value for the current image, based on the selected radar measurement value. On the other hand, in a case in which the first final longitudinal location value and the selected radar measurement value are not within the preset distance, the apparatus for determining the location of a pedestrian may not use the selected radar measurement value to determine the second final longitudinal location value for the current image.

That is, in a case in which the selected radar measurement value for the current image is not located within the preset distance from the first final longitudinal location value of the previous image, the selected radar measurement value may be an erroneous value, and in this case, the apparatus for determining the location of a pedestrian may not use the selected radar measurement value to determine the second final longitudinal location value for the current image.

Meanwhile, the preset distance may be determined considering a time interval between time points at which the current image and the previous image are captured, the moving speed of the pedestrian object, and the like.

In an embodiment, in a case in which the number of radar measurement values located within the preset distance from the longitudinal location candidate value is less than or equal to a first threshold value or greater than or equal to a second threshold value, the apparatus for determining the location of a pedestrian may not select a radar measurement value. The first threshold value may be less than the second threshold value.

The number of radar measurement values varies depending on the object, and for example, because a vehicle has a signal reflection strength and a reflection area greater than those of a pedestrian, the number of radar measurement values for the vehicle is greater than the number of radar measurement values for the pedestrian.

That is, in order to prevent the apparatus for determining the location of a pedestrian from selecting a radar measurement value for an object other than a pedestrian (e.g., a vehicle), the apparatus for determining the location of a pedestrian may select a radar measurement value only in a case in which the number of radar measurement values located within the preset distance from the longitudinal location candidate value is greater than the first threshold value and less than the second threshold value.

In an embodiment, the apparatus for determining the location of a pedestrian may calculate the Doppler velocity of the pedestrian object, based on the selected radar measurement value. In detail, when the pedestrian object moves, a Doppler component due to the movement is generated, and thus, the Doppler velocity of the pedestrian object may be calculated.

When the Doppler velocity is within a possible speed range of pedestrians, the apparatus for determining the location of a pedestrian may determine the final longitudinal location value of the pedestrian object, based on the selected radar measurement value. On the other hand, when the Doppler velocity is out of the possible speed range of pedestrians, the apparatus for determining the location of a pedestrian may not use the selected radar measurement value.

Figure 10:
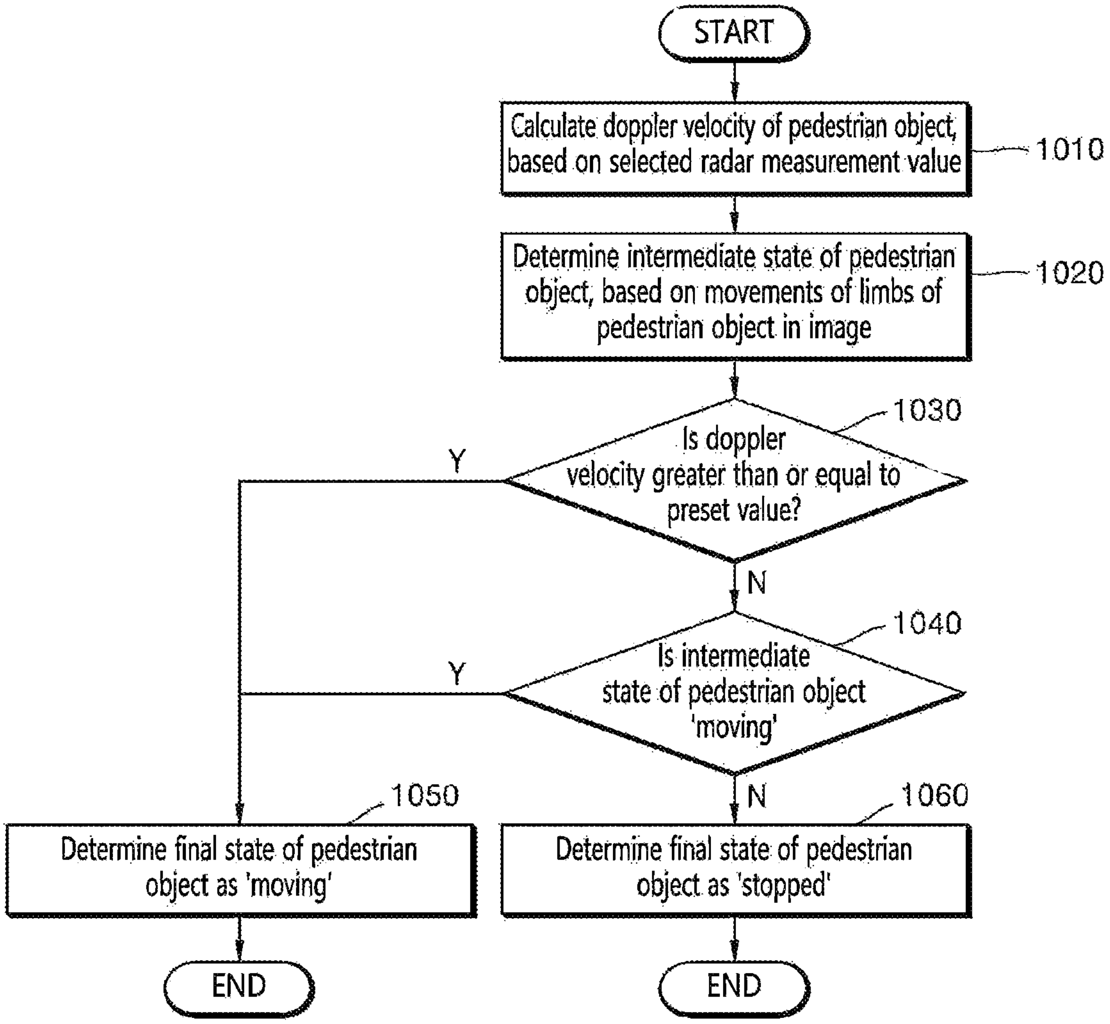
FIG. 10 is a flowchart illustrating a method of determining a state of a pedestrian object according to an embodiment.

FIG. 10 is a flowchart illustrating a method of determining a state of a pedestrian object according to an embodiment.

Referring to FIG. 10, in operation 1010, an apparatus for determining the location of a pedestrian may calculate the Doppler velocity of a pedestrian object, based on a selected radar measurement value. In detail, when the pedestrian object moves, a Doppler component due to the movement is generated, and thus, the Doppler velocity of the pedestrian object may be calculated.

In operation 1020, the apparatus for determining the location of a pedestrian may determine an intermediate state of the pedestrian object, based on the movement of the pedestrian object in an image.

In detail, the apparatus for determining the location of a pedestrian may determine the intermediate state of the pedestrian object as 'moving' in a case in which a movement of the pedestrian object included in a plurality of images obtained from a camera is confirmed, and may determine the intermediate state of the pedestrian object as 'stopped' in a case in which no movement of the pedestrian object is confirmed.

In operation 1030, in a case in which the Doppler velocity calculated in operation 1010 is greater than or equal to a preset value, operation 1050 may be performed, and the apparatus for determining the location of a pedestrian may determine the final state of the pedestrian object as 'moving'. On the other hand, in a case in which the Doppler velocity calculated in operation 1010 is less than the preset value, operation 1040 may be performed.

In operation 1040, in a case in which the intermediate state of the pedestrian object determined in operation 1020 is 'moving', operation 1050 may be performed, and the apparatus for determining the location of a pedestrian may determine the final state of the pedestrian object as 'moving'. On the other hand, in a case in which the intermediate state of the pedestrian object determined in operation 1020 is not 'moving', operation 1060 may be performed.

In operation 1060, the apparatus for determining the location of a pedestrian may determine the final state of the pedestrian object as 'stopped'. That is, in a case in which the Doppler velocity calculated in operation 1010 is less than the preset value and the intermediate state of the pedestrian object determined in operation 1020 is 'stopped', the apparatus for determining the location of a pedestrian may determine the final state of the pedestrian object as 'stopped'.

Meanwhile, when a pedestrian is moving, a movement occurs.

A camera is able to easily detect a movement occurring when the pedestrian is moving in the transverse direction and thus accurately determine whether the pedestrian is moving or not in the transverse direction. On the other hand, the camera is unable to easily detect a movement occurring when the pedestrian is moving in the longitudinal direction, and accordingly, determination of whether the pedestrian is moving or not in the longitudinal direction may be relatively inaccurate.

A radar is able to accurately determine whether the pedestrian is moving or not in the longitudinal direction, because, when the pedestrian is moving in the longitudinal direction, a movement occurs in the radar direction, which generates a Doppler component. On the other hand, when the pedestrian is moving in the transverse direction, the movement is perpendicular to the radar direction, thus, a Doppler component is not generated, and accordingly, determination of whether the pedestrian is moving or not in the transverse direction may be relatively inaccurate.

In an embodiment, in a case in which the Doppler velocity is greater than or equal to the preset value and the intermediate state of the pedestrian object determined based on the image is 'moving', the apparatus for determining the location of a pedestrian may determine that the pedestrian object is moving in the longitudinal and transverse directions.

Alternatively, in a case in which the Doppler velocity is greater than or equal to the preset value but the intermediate state of the pedestrian object determined based on the image is 'stopped', the apparatus for determining the location of a pedestrian may determine that the pedestrian object is moving in the longitudinal direction but is not moving in the transverse direction.

Alternatively, in a case in which the Doppler velocity is less than the preset value but the intermediate state of the pedestrian object determined based on the image is 'moving', the apparatus for determining the location of a pedestrian may determine that the pedestrian object is moving in the transverse direction but is not moving in the longitudinal direction.

In the present disclosure, through radar-camera sensor fusion, it is possible to identify a pedestrian object that is difficult to be identified from a radar measurement value, and more accurately measure the distance between a vehicle and a pedestrian that is difficult to be calculated from a camera image. In addition, it is possible to improve determination of a movement/stop in the longitudinal direction, which is difficult to be determined by using a camera, and determination of a movement/stop in the transverse direction, which is difficult to be determined by using a radar.

Figure 11:
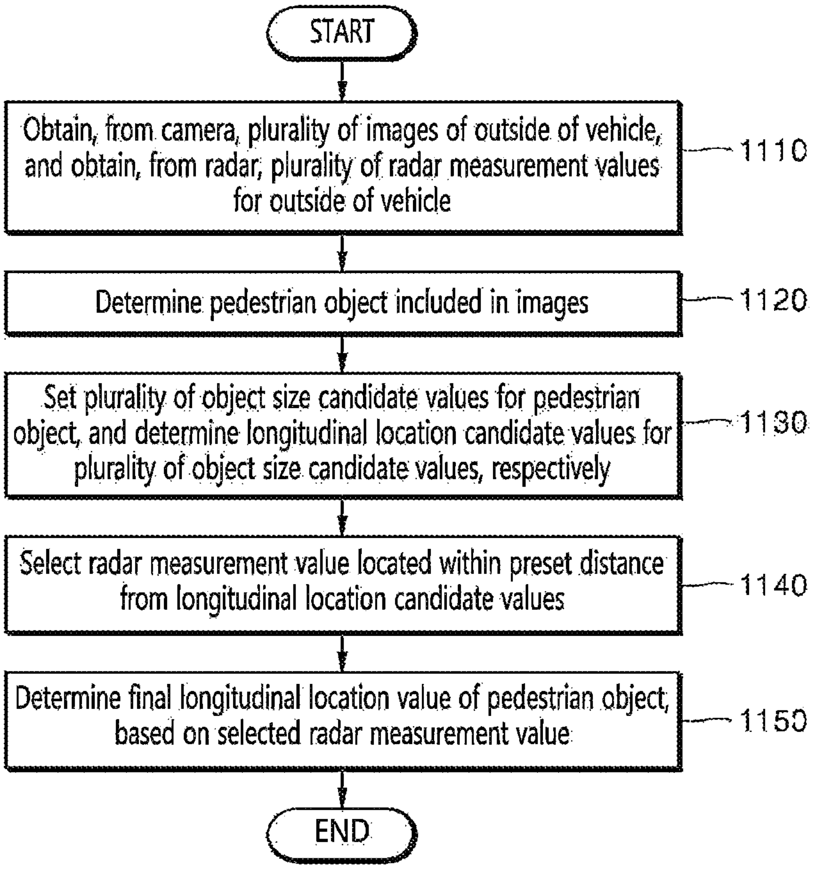
FIG. 11 is a flowchart of a method of determining the location of a pedestrian according to an embodiment.

FIG. 11 is a flowchart of a method of determining the location of a pedestrian according to an embodiment.

The method of determining the location of a pedestrian illustrated in FIG. 11 is related to the embodiments described above with reference to the drawings, and thus, the descriptions provided above but omitted below may be applied to the method illustrated in FIG. 11.

Referring to FIG. 11, in operation 1110, a processor may obtain, from a camera, a plurality of images of the outside of a vehicle, and obtain, from a radar, a plurality of radar measurement values for the outside of the vehicle.

The camera may be mounted on the vehicle to photograph the outside of the vehicle. The camera may photograph front, side, and rear areas around the vehicle. The processor may obtained the plurality of images captured by the camera. The plurality of images captured by the camera may include a plurality of objects.

The radar may be mounted on the vehicle to sense an object outside the vehicle. The radar may sense front, side, and rear areas around the vehicle. The processor may obtain, from the radar, the plurality of radar measurement values for the outside of the vehicle.

In operation 1120, the processor may determine a pedestrian object included in the images.

The plurality of images may include a previous image and a current image. The processor may obtain first location information of a first pedestrian object recognized in the previous image, and second location information of a second pedestrian object recognized in the current image. The processor may determine whether the first pedestrian object and the second pedestrian object are the same pedestrian object, based on the similarity between the first location information and the second location information.

The processor may receive raw data from a sensor and filter sensing data. Also, the processor may perform clustering on the filtered sensing data, and perform an association operation. Also, the processor may predict a movement of an object. Also, the processor may selectively update a track list and perform an object tracking operation.

In operation 1130, the processor may set a plurality of object size candidate values for the pedestrian object, and determine longitudinal location candidate values for the plurality of object size candidate values, respectively.

The plurality of object size candidate values may be values into which a possible height range of the pedestrian is divided by a preset interval.

The processor may determine longitudinal location candidate values by using the object size candidate values, pixel values of the object, and the focal length of the camera.

In operation 1140, the processor may select a radar measurement value located within a preset distance from the longitudinal location candidate values.

The processor may remove outliers for the radar measurement value.

In an embodiment, the processor may obtain a first final longitudinal location value of the pedestrian object for the previous image. The processor may obtain a selected radar measurement value for the current image. In a case in which the first final longitudinal location value and the selected radar measurement value are within a preset distance, the processor may determine a second final longitudinal location value for the current image, based on the selected radar measurement value.

In an embodiment, in a case in which the number of radar measurement values located within the preset distance from the longitudinal location candidate value is less than or equal to a first threshold value or greater than or equal to a second threshold value, the processor may not select a radar measurement value.

In an embodiment, the processor may calculate a Doppler velocity based on the selected radar measurement value. When the Doppler velocity is within a possible speed range of pedestrians, the processor may determine the final longitudinal location value of the pedestrian object, based on the selected radar measurement value.

In operation 1150, the processor may determine a final longitudinal location value of the pedestrian object, based on the selected radar measurement value.

The processor may determine, as the final longitudinal location value, a value derived by applying the selected radar measurement value to a Kalman filter.

In an embodiment, the processor may calculate the Doppler velocity based on the selected radar measurement value, and determine an intermediate state of the pedestrian object, based on a movement of the pedestrian object in the images.

In a case in which the Doppler velocity is greater than or equal to a preset value or the intermediate state of the pedestrian object is 'moving', the processor may determine the final state of the pedestrian object as 'moving'. On the other hand, in a case in which the Doppler velocity is less than the preset value and the intermediate state of the pedestrian object is 'stopped', the processor may determine the final state of the pedestrian object as 'stopped'.

Figure 12:
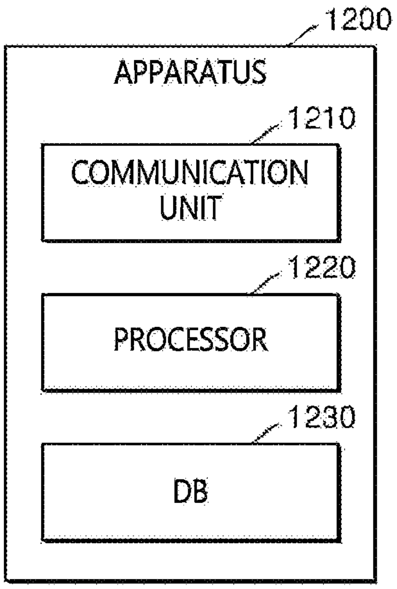
FIG. 12 is a block diagram of an apparatus for determining the location of a pedestrian according to an embodiment.

FIG. 12 is a block diagram of an apparatus for determining the location of a pedestrian according to an embodiment.

Referring to FIG. 12, an apparatus 1200 for determining the location of a pedestrian may include a communication unit 1210, a processor 1220, and a database (DB) 1230. FIG. 12 illustrates the apparatus 1200 for determining the location of a pedestrian including only the components related to an embodiment. Therefore, it would be understood by those of skill in the art that other general-purpose components may be further included in addition to those illustrated in FIG. 12.

The communication unit 1210 may include one or more components for performing wired/wireless communication with an external server or an external device. For example, the communication unit 1210 may include at least one of a short-range communication unit (not shown), a mobile communication unit (not shown), and a broadcast receiver (not shown).

The DB 1230 is hardware for storing various pieces of data processed by the apparatus 1200 for determining the location of a pedestrian, and may store a program for the processor 1220 to perform processing and control.

The DB 1230 may include random-access memory (RAM) such as dynamic RAM (DRAM) or static RAM (SRAM), read-only memory (ROM), electrically erasable programmable ROM (EEPROM), a compact disc-ROM (CD-ROM), a Blu-ray or other optical disk storage, a hard disk drive (HDD), a solid-state drive (SSD), or flash memory.

The processor 1220 controls the overall operation of the apparatus 1200 for determining the location of a pedestrian. For example, the processor 1220 may execute programs stored in the DB 1230 to control the overall operation of an input unit (not shown), a display (not shown), the communication unit 1210, the DB 1230, and the like. The processor 1220 may execute programs stored in the DB 1230 to control the operation of the apparatus 1200 for determining the location of a pedestrian.

The processor 1220 may control at least some of the operations of the apparatus 1200 for determining the location of a pedestrian described above with reference to FIGS. 1 to 11.

Also, the processor 1220 may determine the location of a pedestrian by using the methods described above with reference to FIGS. 1 to 11, and control driving of a vehicle, based on the determining.

The processor 1220 may control the driving of the vehicle, based on at least two factors among the speed of the vehicle, the distance between the vehicle and a pedestrian object, the final state of the pedestrian object, and the width of a road on which the vehicle is traveling.

Meanwhile, a processor for determining the location of a pedestrian and a processor for controlling driving of a vehicle may be separated from each other in terms of hardware, and mounted on different devices, but for convenience of description, it will be described that their functions are performed by the processor 1220.

For example, in a case in which the speed of the vehicle is greater than or equal to a preset speed (e.g., 30 km/h) and the distance between the vehicle and a pedestrian object is less than or equal to a preset distance (e.g., 50 m), the processor 1220 may control the vehicle to stop.

Alternatively, in a case in which, regardless of the speed of the vehicle, the distance between the vehicle and the pedestrian object is less than or equal to the preset distance (e.g., 50 m), the width of the road is less than or equal to a preset width (e.g., 3 m), and the pedestrian object is moving, the processor 1220 may control the vehicle to stop.

The processor 1220 may be implemented by using at least one of application-specific integrated circuits (ASICs), digital signal processors (DSPs), digital signal processing devices (DSPDs), programmable logic devices (PLDs), field-programmable gate arrays (FPGAs), controllers, microcontrollers, microprocessors, and other electrical units for performing functions.

In an embodiment, the apparatus 1200 for determining the location of a pedestrian may be a mobile electronic device. For example, the apparatus 1200 for determining the location of a pedestrian may be implemented as a smart phone, a tablet personal computer (PC), a PC, a smart television (TV), a personal digital assistant (PDA), a laptop computer, a media player, a navigation system, a camera-equipped device, and other mobile electronic devices. In addition, the apparatus 1200 for determining the location of a pedestrian may be implemented as a wearable device having a communication function and a data processing function, such as a watch, glasses, a hair band, a ring, or the like.

In another embodiment, the apparatus 1200 for determining the location of a pedestrian may be an electronic device embedded in a vehicle. For example, the apparatus 1200 for determining the location of a pedestrian may be an electronic device that is manufactured and then inserted into a vehicle through tuning.

As another embodiment, the apparatus 1200 for determining the location of a pedestrian may be a server located outside a vehicle. The server may be implemented as a computer device or a plurality of computer devices that provide a command, code, a file, content, a service, and the like by performing communication through a network. The server may receive data necessary for determining a moving path of the vehicle from devices mounted on the vehicle, and determine the moving path of the vehicle based on the received data.

In another embodiment, a process performed by the apparatus 1200 for determining the location of a pedestrian may be performed by at least some of a mobile electronic device, an electronic device embedded in the vehicle, and a server located outside the vehicle.

Embodiments of the present disclosure may be implemented as a computer program that may be executed through various components on a computer, and such a computer program may be recorded in a computer-readable medium. In this case, the medium may include a magnetic medium, such as a hard disk, a floppy disk, or a magnetic tape, an optical recording medium, such as a CD-ROM or a digital video disc (DVD), a magneto-optical medium, such as a floptical disk, and a hardware device specially configured to store and execute program instructions, such as ROM, RAM, or flash memory.

Meanwhile, the computer program may be specially designed and configured for the present disclosure or may be well-known to and usable by those skill in the art of computer software. Examples of the computer program may include not only machine code, such as code made by a compiler, but also high-level language code that is executable by a computer by using an interpreter or the like.

According to an embodiment, the method according to various embodiments disclosed herein may be included in a computer program product and provided. The computer program products may be traded as commodities between sellers and buyers. The computer program product may be distributed in the form of a machine-readable storage medium (e.g., a CD-ROM), or may be distributed online (e.g., downloaded or uploaded) through an application store (e.g., Play Store™) or directly between two user devices. In a case of online distribution, at least a portion of the computer program product may be temporarily stored in a machine-readable storage medium such as a manufacturer's server, an application store's server, or a memory of a relay server.

The operations of the methods described herein may be performed in any suitable order unless otherwise indicated herein or otherwise clearly contradicted by context. The present disclosure is not limited to the described order of the operations. The use of any and all examples, or exemplary language (e.g., 'and the like') provided herein, is intended merely to better illuminate the present disclosure and does not pose a limitation on the scope of the present disclosure unless otherwise claimed. In addition, various modifications, combinations, and adaptations will be readily apparent to those skill in the art without departing from the following claims and equivalents thereof.

Accordingly, the spirit of the present disclosure should not be limited to the above-described embodiments, and all modifications and variations which may be derived from the meanings, scopes and equivalents of the claims should be construed as failing within the scope of the present disclosure.

According to the above-mentioned aspects of the present disclosure, in the present disclosure, through radar-camera sensor fusion, it is possible to identify a pedestrian object that is difficult to be identified from a radar measurement value, and more accurately measure the distance between a vehicle and a pedestrian, which is difficult to be calculated from a camera image.

In addition, according to the aspects of the present disclosure, it is possible to improve determination of a movement/stop in the longitudinal direction, which is difficult to be determined by using a camera, and determination of a movement/stop in the transverse direction, which is difficult to be determined by using a radar.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A method of determining a location of a pedestrian, the method comprising:

obtaining, from a camera, a plurality of images of an outside of an autonomous vehicle, wherein the plurality of images comprise a previous image and a current image, and obtaining, from a radar, a plurality of radar measurement values of the outside of the autonomous vehicle;

determining a second pedestrian object included in the current image;

setting a plurality of object size candidate values for the second pedestrian object, wherein each of the plurality of object size candidate values is a possible actual size of the second pedestrian object, and determining longitudinal location candidate values for the plurality of object size candidate values, respectively;

selecting a plurality of radar measurement values located within a first preset distance from the plurality of longitudinal location candidate values, determining a second final longitudinal location value of the second pedestrian object, based on the selected radar measurement values; and controlling driving of the autonomous vehicle based on the second final longitudinal location value, wherein the determining of the second final longitudinal location value comprises:

obtaining a first final longitudinal location value of a first pedestrian object included in the previous image;

removing, from the selected radar measurement values, one or more radar measurement values of which a distance from the first final longitudinal location value is equal to or greater than a second preset distance; and determining the second final longitudinal location value based on radar measurement values remaining after removing, from the selected radar measurement values, the radar measurement values of which the distance from the first final longitudinal location value is equal to or greater than the second preset distance.

2. The method of claim 1, wherein the determining of the second pedestrian object comprises:

obtaining first location information of the first pedestrian object that is recognized in the previous image;

obtaining second location information of the second pedestrian object that is recognized in the current image; and determining whether the first pedestrian object and the second pedestrian object are the same pedestrian object, based on a similarity between the first location information and the second location information.

3. The method of claim 1, wherein the plurality of object size candidate values are values into which a possible height range of a pedestrian is divided by a preset interval.

4. The method of claim 3, wherein the determining of the longitudinal location candidate values comprises determining the longitudinal location candidate values by using the plurality of object size candidate values, pixel values of the second pedestrian object, and a focal length of the camera.

5. The method of claim 1, wherein the determining of the second final longitudinal location value comprises:

calculating a Doppler velocity based on the selected radar measurement values; and determining the second final longitudinal location value of the pedestrian object, based on the selected radar measurement values and whether or not the Doppler velocity is within a possible speed range of a pedestrian.

6. The method of claim 1, further comprising:

calculating a Doppler velocity based on the selected radar measurement values;

determining an intermediate state of the second pedestrian object, based on movements of limbs of the second pedestrian object in the plurality of images; and determining a final state of the second pedestrian object based on whether or not Doppler velocity is greater than or equal to a preset value and the intermediate state of the second pedestrian object.

7. The method of claim 6, wherein the determining of the final state comprises, in a case in which the Doppler velocity is less than the preset value and the intermediate state of the pedestrian object is 'stopped', determining the final state of the pedestrian object as 'stopped' and In a case in which the Doppler velocity is greater than or equal to the preset value or the intermediate state of the pedestrian object is 'moving', determining the final state of the pedestrian object as 'moving'.

8. The method of claim 1, further comprising determining, as the final longitudinal location value, a value derived by applying the selected radar measurement values to a Kalman filter.

9. A non-transitory computer-readable recording medium having recorded thereon a program for executing, on a computer, the method of claim 1.

10. The method of claim 1, wherein the selecting of the radar measurement values comprises selecting the plurality of radar measurement values location candidate values, based on whether or not a number of radar measurement values located within the preset distance from the plurality of longitudinal location candidate values greater than a first threshold value and less than a second threshold value, wherein the first threshold value is less than the second threshold value.

11. An apparatus for determining a location of a pedestrian, the apparatus comprising:

a memory storing at least one program; and a processor configured to execute the at least one program to perform an operation, wherein the processor is further configured to obtain, from a camera, a plurality of images of an outside of a autonomous vehicle, wherein the plurality of images comprise a previous image and a current image, obtain, from a radar, a plurality of radar measurement values of the outside of the autonomous vehicle, determine a second pedestrian object included in the current image, set a plurality of object size candidate values for the second pedestrian object, wherein each of the plurality of object size candidate values is a possible actual size of the second pedestrian object, determine longitudinal location candidate values for the plurality of object size candidate values, respectively, select a plurality of radar measurement values located within a first preset distance from the plurality of longitudinal location candidate values, determine a second final longitudinal location value of the second pedestrian object, based on the selected radar measurement values, and control driving of the autonomous vehicle based on the second final longitudinal location value, wherein the processor is further configured to obtain a first final longitudinal location value of a first pedestrian object included in the previous image, remove, from the selected radar measurement values, one or more radar measurement values of which a distance from the first final longitudinal location value is equal to or greater than a second preset distance, and determine the second final longitudinal location value based on radar measurement values remaining after removing, from the selected radar measurement values, the radar measurement values of which the distance from the first final longitudinal location value is equal to or greater than the second preset distance.

* * * * *